United States Patent Office 3,272,802
Patented Sept. 13, 1966

1

3,272,802
5β-CHLOROMETHYL-19-NOR-ANDROSTANE AND PREGNANE DERIVATIVES AND PROCESS FOR PRODUCTION THEREOF
Lawrence H. Knox, Mexico City, Mexico, assignor to Syntex Corporation, Panama, Panama, a corporation of Panama
No Drawing. Filed Oct. 23, 1964, Ser. No. 406,157
21 Claims. (Cl. 260—239.55)

The present invention relates to novel cyclopentanophenanthrene derivatives and to a process for the production thereof.

More particularly the present invention relates to novel 5β-chloromethyl-19-nor-androstane and pregnane derivatives, and to a process for the production thereof.

The novel compounds of the present invention are represented by the following formulae:

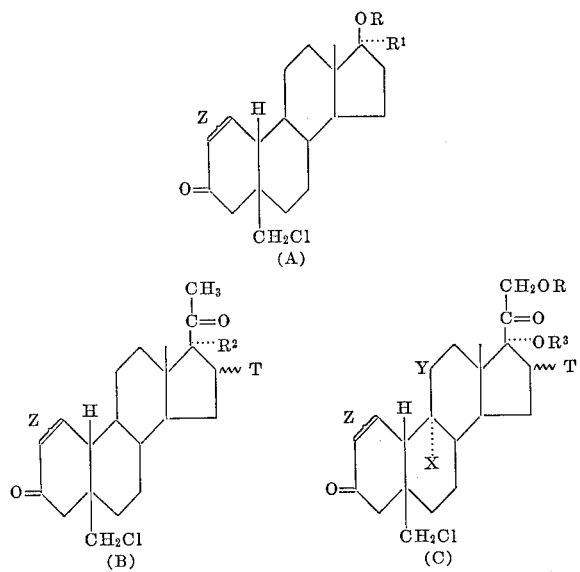

In the above formulae, R represents hydrogen or a hydrocarbon carboxylic acyl group of less than 12 carbon atoms; $R^1$ represents hydrogen, lower alkyl, lower alkenyl or lower alkinyl; $R^2$ represents hydrogen, hydroxyl or a hydrocarbon carboxylic acyloxy group of less than 12 carbon atoms; $R^3$ represents hydrogen; T represents hydrogen or methyl, the latter preferably at the α-position in formula C; $R^2$ and T together and —$OR^3$ and T together, represent a 16α,17α-lower alkylidenedioxy grouping; X represents hydrogen, fluorine or chlorine; Y represents a β-hydroxyl group or keto; Z represents a single or a double bond; and —OR and $R^1$ together represent keto.

The acyl and acyloxy groups are derived from hydrocarbon carboxylic acids containing less than 12 carbon atoms which may be saturated or unsaturated, of straight, branched, cyclic or cyclicaliphatic chain, or aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by Formula A are anabolic-androgenic agents with a favorable anabolic-androgenic ration. In addition, they have anti-estrogenic, anti-gonadotrophic, anti-fibrillatory and appetite stimulating properties. Further, they lower the blood cholesterol level, relieve premenstrual tension and suppress the output of the pituitary gland.

The compounds represented by formula B are progestational agents with oral activity. In addition they have anti-androgenic, anti-gonadotrophic and anti-estrogenic properties and are useful in fertility control. Furthermore, they may be used in the treatment of premenstrual tension and exhibit blood cholesterol lowering and diuretic activities. When applied topically, these compounds are useful in the treatment of acne.

The compounds represented by formula C are valuable cortical hormones with anti-inflammatory, low catabolic, glycogenic and thymolytic activities. In addition, they are anti-androgenic, anti-gonadotrophic and anti-estrogenic hormones. Furthermore, they have topical activity in skin disorders such as psoriasis, allergic dermatitis and the like.

In accordance with the present invention there was made the surprising and unexpected discovery that the compounds represented by the above formulae are obtained by treating, indistinctly, either the corresponding 5,19-cyclo-$\Delta^1$-3-keto steroid, the corresponding 5,10-seco-5,19-cyclo-10β-fluoro-$\Delta^4$-3-keto steroid or a mixture of both with hydrochloric acid in an organic solvent.

The aforesaid starting compounds suitable for the process of the present invention are, preferably, of the androstane and pregnane series, and may be prepared in accordance with my copending U.S. patent application Serial No. 286,931 filed June 11, 1963, now U.S. Patent No. 3,184,484 by treatment of the corresponding 19-hydroxy-$\Delta^4$-3-keto compound with about 1 molar equivalent of 2-chloro-1,1,2-trifluorotriethylamine, thus affording a mixture of the corresponding 5,19-cyclo-$\Delta^1$-3-ketone, and the corresponding 5,10-seco-5,19-cyclo-10β-fluoro-$\Delta^4$-3-ketone. This mixture as such, may constitute the starting material for the process of the present invention, or may be separated conventionally into its components and either of the latter used as a starting compound. The nomenclature used in the aforesaid application was changed from 5,10-methylene-19-nor- to 5,19-cyclo for naming exactly the same moiety. Both nomenclatures are correct but the latter was chosen in the present case for the sake of simplicity. In addition to the mentioned substituents, the starting compound may have additional substituents which do not interfere with the reaction of the present process. For example there may be hydroxyl or acyloxy groups present at positions 11, 12, 15, 16, 17 and/or 21; keto groups at positions 11, 12, 15, 16, 17 or 20; lower hydrocarbon residues at positions 11, 12, 15, 16, and/or 17; halogens at positions 9, 11, 12, 15, 16 and/or 21 and the like. The above mentioned positions and substituents are only illustrative and should not be construed as being limitative.

Secondary or primary acyloxy groups, even though they generally undergo hydrolysis during the reaction, do not interfere with the normal course thereof.

The novel compounds of the present invention are prepared by the process exemplified as follows:

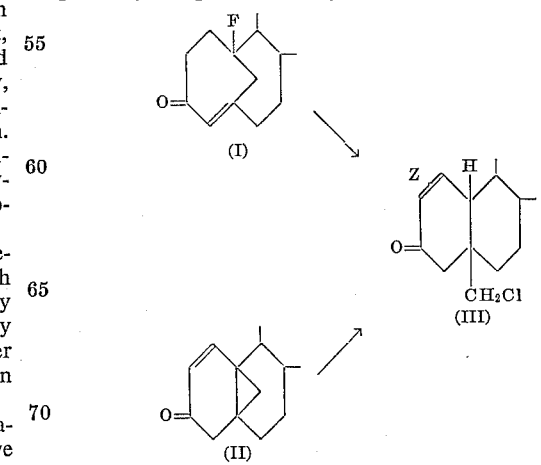

In the above formulae, only rings A and B of the steroid nucleus are represented and Z has the same meaning set forth hereinbefore. In accordance with the above equation, the starting compound I or II, of the type described hereinbefore, or a mixture of both, is treated with at least one molar equivalent of hydrochloric acid, but preferably with an excess thereof, preferably but not necessarily in a suitable organic water miscible solvent, which has no critical importance and may be any organic solvent inert to the action of hydrochloric acid capable of forming a homogeneous mixture with at least 0.5% of its volume of water, such as a lower alkanol, e.g., methanol, ethanol, isopropanol, and the like, a lower aliphatic or alicyclic hydrocarbon ether, e.g., dioxane, tetrahydrofuran, ethyl ether, isopropyl ether and the like, etc., preferably at reflux temperature of the reaction mixture for a period of time of about 30 minutes to 1 hour, thus affording the corresponding 5β-chloromethyl-Δ¹-19-nor (androsten or pregnen)3-one derivative (III; Z= double bond) which upon conventional hydrogenation yields the corresponding 1,2-saturated compound (III; Z=single bond).

The compounds of the present invention having a primary and/or a secondary hydroxyl group, are conventionally acylated in pyridine with an acylating agent, such as an anhydride or a chloride of a hydrocarbon carboxylic acid of the type described hereinbefore, to give the corresponding acylates.

The compounds of the present invention having in the molecule a tertiary hydroxyl group, e.g., at C, are conventionally esterified in the presence of p-toluenesulfonic acid with an acylating agent, such as acetic anhydride, caproic anhydride, cyclopentylpropionic anhydride, or enanthic anhydride, to produce the corresponding esters.

The following specific examples serve to illustrate but are not intended to limit the scope of the present invention:

Example I

A mixture of 1 g. of 5,19-cyclo-Δ¹-androstene-3,17-dione (obtained in accordance with my aforementioned copending U.S. patent application, wherein it is named 5,10 - methylene - 19 - nor - Δ¹ - androstene - 3,17-dione), 50 cc. of ethanol and 2 cc. of concentrated hydrochloric acid was refluxed for 1 hour. The resulting solution was diluted with water, extracted with methylene chloride, the extract successively washed with dilute aqueous sodium bicarbonate solution and water, dried over anhydrous sodium sulfate and evaporated to dryness. The residue was crystallized from acetonehexane, to give 5β-chloromethyl-Δ¹-19-nor-androstene-3,17-dione. (Compound No. 1).

Example II 5,10 - seco- 5,19 - cyclo - 10β - fluoro - Δ⁴ - androstene-3,17-dione (obtained according to my aforesaid Application) was treated following the procedure of Example I, thus yielding 5β-chloromethyl-Δ¹-19-nor-androstene-3,17-dione (Cpd. No. 1).

Example III 1 g. of a mixture of 5,10-seco-5,19-cyclo-10β-fluoro-Δ⁴-androstene-3,17-dione and 5,19-cyclo-Δ¹-androstene-3,17-dione, was treated according to Example I, thus affording 5β - chloromethyl - Δ¹ - 19 - nor - androstene-3,17-dione (Cpd. No. 1).

Example IV

The procedure described in Example I was repeated, except that ethanol was substituted by methanol and the reaction time was of 30 minutes, thus affording the same final compound.

Example V

The procedure described in Example I was repeated, except that ethanol was substituted by tetrahydrofuran, and the amount of hydrochloric acid used was one molar equivalent, thus giving the same final compound.

Example VI

The starting compounds listed under I (obtained according to my aforementioned U.S. patent application) were treated according to Example I, thus yielding the corresponding products set forth under II:

| I | Cpd. No. | II |
|---|---|---|
| 5,19-cyclo-17α-methyl-Δ¹-androsten-17β-ol-3-one. | 2 | 5β-chloromethyl-17α-methyl-Δ¹-19-nor-androsten-17β-ol-3-one. |
| 5,19-cyclo-17α-vinyl-Δ¹-androsten-17β-ol-3-one. | 3 | 5β-chloromethyl-17α-vinyl-Δ¹-19-nor-androsten-17β-ol-3-one. |
| 5,19-cyclo-17α-ethinyl-Δ¹-androsten-17β-ol-3-one. | 4 | 5β-chloromethyl-17α-ethinyl-Δ¹-19-nor-androsten-17β-ol-3-one. |
| 5,19-cyclo-Δ¹-androsten-17β-ol-3-one. | 5 | 5β-chloromethyl-Δ¹-19-nor-androsten-17β-ol-3-one. |
| 5,10-seco-5,19-cyclo-10β-fluoro-Δ⁴-pregnene-3,20-dione. | 6 | 5β-chloromethyl-Δ¹-19-nor-pregnene-3,20-dione. |
| 5,10-seco-5,19-cyclo-10β-fluoro-16α-methyl-Δ⁴-pregnene-3,20-dione. | 7 | 5β-chloromethyl-16α-methyl-Δ¹-19-nor-pregnene-3,20-dione. |
| 5,10-seco-5,19-cyclo-10β-fluoro-16β-methyl-Δ⁴-pregnene-3,20-dione. | 8 | 5β-chloromethyl-16β-methyl-Δ¹-19-nor-pregnene-3,20-dione. |
| 5,10-seco-5,19-cyclo-10β-fluoro-16α,17α-isopropylidenedioxy-Δ⁴-pregnene-3,20-dione. | 9 | 5β-chloromethyl-16α,17α-isopropylidenedioxy-Δ¹-19-nor-pregnene-3,20-dione. |
| The 17-acetate of 5,10-seco-5,19-cyclo-10β-fluoro-Δ⁴-pregnen-17α-ol-3,20-dione. | 10 | 5β-chloromethyl-Δ¹-19-nor-pregnen-17α-ol-3,20-dione acetate. |
| 5,19-cyclo-16α-methyl-Δ¹-pregnen-17α-ol-3,20-dione. | 11 | 5β-chloromethyl-16α-methyl-Δ¹-19-nor-pregnen-17α-ol-3,20-dione. |
| 5,19-cyclo-16α-methyl-Δ¹-pregnene-11β,17α,21-triol 3,20-dione. | 12 | 5β-chloromethyl-16α-methyl-Δ¹-19-nor-pregnene-11β,17α,21-triol-3,20-dione. |
| The 21-acetate of 5,19-cyclo-16α-methyl-Δ¹-pregnene-17α,21-diol-3,11,20-trione. | 13 | 5β-chloromethyl-16α-methyl-Δ¹-19-nor-pregnene-17α,21-diol-3,11,20-trione. |
| 5,10-seco-5,19-cyclo-10β-fluoro-Δ⁴-pregnene-11β,17α,21-triol-3,20-dione. | 14 | 5β-chloromethyl-Δ¹-19-nor-pregnene-11β,17α,21-triol-3,20-dione. |
| 5,10-seco-5,19-cyclo-10β-fluoro-Δ⁴-pregnene-17α,21-diol-3,11,20-trione. | 15 | 5β-chloromethyl-Δ¹-19-nor-pregnene-17α,21-diol-3,11,20-trione. |
| The 21-acetate of 5,19-cyclo-9α-fluoro-Δ¹-pregnene-11β,17α,21-triol-3,20-dione | 16 | 5β-chloromethyl-9α-fluoro-Δ¹-19-nor-pregnene-11β,17α,21-triol-3,20-dione. |
| The 21-acetate of 5,19-cyclo-16α-methyl-9α-fluoro-Δ¹-pregnene-11β,17α,21-triol-3,20-dione. | 17 | 5β-chloromethyl-16α-methyl-9α-fluoro-Δ¹-19-nor-pregnene-11β,17α,21-triol-3,20-dione. |
| The 21-acetate of 5,19-cyclo-16α-methyl-9α-chloroΔ¹-pregnene-11β,17α,21-triol-3,20-dione. | 18 | 5β-chloromethyl-16α-methyl-9α-chloro-Δ¹-19-nor-pregnene-11β,17α,21-triol-3,20-dione. |
| The 21-acetate of 5,19-cyclo-16α-methyl-9α-chloro-Δ¹-pregneno-17α,21-diol-3,11,20-trione. | 19 | 5β-chloromethyl-16α-methyl-9α-chloro-Δ¹-19-nor-pregnene-17α,21-diol-3,11,20-trione. |
| The 21-acetate of 5,19-cyclo-16α,17α-isopropylidenedioxy-Δ¹-pregnene-11β,21-diol-3,20-dione. | 20 | 5β-chloromethyl-16α,17α-isopropylidenedioxy-Δ¹-19-nor-pregnene-11β,21-diol-3,20-dione. |
| The 21-acetate of 5,19-cyclo-16α,17α-isopropylidenedioxy-9α-fluoro-Δ¹-pregnene-11β,21-diol-3,20-dione. | 21 | 5β-chloromethyl-16α,17α-isopropylidenedioxy-9α-fluoro-Δ¹-19-nor-pregnene-11β,21-diol-3,20-dione. |

Example VII

A suspension of 0.5 g. of 5% palladium on carbon catalyst in 50 cc. of methanol was hydrogenated for 30 minutes. A solution of 2 g. of 5β-chloromethyl-Δ¹-19-nor-androstene-3,17-dione (Cpd. No. 1) in 200 cc. of methanol was added to the catalyst and stirred under a hydrogen atmosphere until the uptake of hydrogen ceased. After removal of the catalyst by filtration the solution was evaporated and the crude residue was purified by crystallization from methylene chloride-hexane, thus giving 5β - chloro-19 - nor - androstane - 3,17 - dione (Cpd. No. 22).

The compounds Nos. 2 to 21, inclusive, were treated by the same procedure, thus giving respectively:
Cpd. No.

(23) 5β-chloromethyl-17α-methyl-19-nor-androstan-17-β-ol-3-one,

(24) 5β-chloromethyl-17α-vinyl-19-nor-androstan-17-β-ol-3-one,

(25) 5β-chloromethyl-17α-ethinyl-19-nor-androstan-17-β-ol-3-one,
(26) 5β-chloromethyl-19-nor-androstan-17β-ol-3-one,
(27) 5β-chloromethyl-19-nor-pregnane-3,20-dione,
(28) 5β-chloromethyl-16α-methyl-19-nor-pregnane-3,20-dione,
(29) 5β-chloromethyl-16β-methyl-19-nor-pregnane-3,20-dione,
(30) 5β-chloromethyl-16α,17α-isopropylidenedioxy-19-nor-pregnane-3,20-dione,
(31) 5β-chloromethyl-19-nor-pregnan-17α-ol-3,20-dione acetate,
(32) 5β-chloromethyl-16α-methyl-19-nor-pregnan-17α-ol-3,20-dione,
(33) 5β-chloromethyl-16α-methyl-19-nor-pregnane-11β,17α,21-triol-3,20-dione,
(34) 5β-chloromethyl-16α-methyl-19-nor-pregnane-17α,21-diol-3,11,20-trione,
(35) 5β-chloromethyl-19-nor-pregnane-11β,17α,21-triol-3,20-dione,
(36) 5β-chloromethyl-19-nor-pregnane-17α,21-diol-3,11,20-trione,
(37) 5β-chloromethyl-9α-fluoro-19-nor-pregnane-11β,17α,21-triol-3,20-dione,
(38) 5β-chloromethyl-16α-methyl-9α-fluoro-19-nor-pregnane-11β,17α,21-triol-3,20-dione,
(39) 5β-chloromethyl-16α-methyl-9α-chloro-19-nor-pregnane-11β,17α,21-triol-3,20-dione,
(40) 5β-chloromethyl-16α-methyl-9α-chloro-19-nor-pregnane-17α,21-diol-3,11,20-trione,
(41) 5β-chloromethyl-16α,17α-isopropylidenedioxy-19-nor-pregnane-11β,21-diol-3,20-dione,
(42) 5β-chloromethyl-16α,17α-isopropylidenedioxy-9α-fluoro-19-nor-pregnane-11β,21-diol-3,20-dione.

*Example VIII*

A mixture of 1 g. of compound No. 5, 4 cc. of pyridine and 2 cc. of acetic anhydride was kept at room temperature over night, poured into ice water, the formed precipitate was filtered, washed with water and dried. Crystallization from acetone-hexane gave 5β-chloromethyl-Δ¹-19-nor-androsten-17β-ol-3-one acetate (Cpd. No. 43).

Compound No. 26 was treated by the same procedure to give 5β - chloromethyl-19-nor-androstan-17β-ol-3-one acetate (Cpd. No. 44).

The compounds Nos. 12 to 21, inclusive, and 33 to 42, inclusive, were treated by the same procedure, thus yielding the corresponding 21-acetates.

*Example IX*

The starting compounds of Example VIII were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

*Example X*

To a solution of 5 g. of compound No. 2 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 5β - chloromethyl-17α-methyl-Δ¹-19-nor-androsten-17β-ol-3-one caproate (Cpd. No. 45).

The compounds Nos. 3, 4, 11, 23, 24, 25 and 32 were treated by the same procedure thus affording the corresponding 17-caproates.

*Example XI*

The starting compounds of Example X were treated following exactly the procedure described in that Example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

I claim:
1. A compound of the following formula:

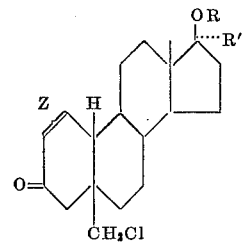

wherein R is selected from the group consisting of hydrogen and a hydrocarbon carboxylic acyl group of less than 12 carbon atoms; $R^1$ is selected from the group consisting of hydrogen, lower alkyl, lower alkenyl, and lower alkinyl; Z is selected from the group consisting of a double bond and a single bond; and OR and $R^1$ together represent keto.

2. 5β - chloromethyl-Δ¹-19-nor-androsten-17β-ol-3-one.
3. 5β - chloromethyl-17α-methyl-Δ¹-19-nor-androsten-17β-ol-3-one.
4. 5β - chloromethyl - 17α - vinyl-Δ¹-19-nor-androsten-17β-ol-3-one.
5. 5β - chloromethyl-17α-ethinyl-Δ¹-19-nor-androsten-17β-ol-3-one.
6. A compound of the following formula:

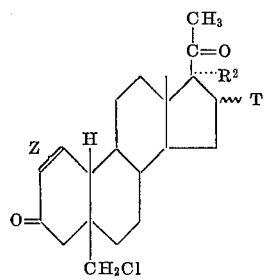

wherein $R^2$ is a member of the group consisting of hydrogen, hydroxyl and a hydrocarbon carboxylic acyloxy group of less than 12 carbon atoms; T is selected from the group consisting of hydrogen and methyl; $R^2$ and T together form a 16α,17α-lower alkylidenedioxy grouping; and Z is selected from the group consisting of a double bond and a single bond.

7. 5β - chloromethyl-Δ¹-19-nor-pregnene-3,20-dione.
8. 5β - chloromethyl - 16 - methyl-Δ¹-19-nor-pregnene-3,20-dione.
9. 5β-chloromethyl - 16α,17α - isopropylidenedioxy-Δ¹-19-nor-pregnene-3,20-dione.
10. 5β-chloromethyl - Δ¹ - 19 - nor-pregnen-17α-ol-3,20-dione acetate.
11. 5β-chloromethyl - 16α - methyl-Δ¹-19-nor-pregnen-17a-ol-3,20-dione.
12. A compound of the following formula:

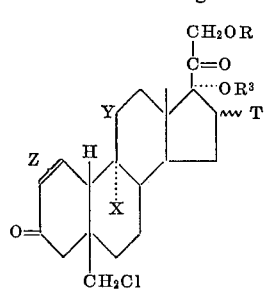

wherein R is selected from the group consisting of hydrogen and a hydrocarbon carboxylic acyl group of less than 12 carbon atoms; $R^3$ is a hydrogen; X is selected from the group consisting of hydrogen, fluorine and chlorine; Y is a member of the group consisting of β-hydroxyl and keto; Z is selected from the group consisting of a single bond and a double bond; T is selected from the group consisting of hydrogen and methyl; and $OR^3$ and T together form a 16α,17a-lower alkylidenedioxy grouping.

13. 5β - chloromethyl - 16α - methyl-$\Delta^1$-19-nor-pregnene-11β,17α,21-triol-3,20-dione.

14. 5β - chloromethyl - 16α - methyl-$\Delta^1$-19-nor-pregnene-17α,21-diol-3,11,20-trione.

15. 5β - chloromethyl - $\Delta^1$ - 19 - nor - pregnene-17α,21-diol-3,11,20-trione.

16. 5β - chloromethyl - $\Delta^1$ - 19 - nor - pregnene-11β,17α,21-triol-3,20-dione.

17. 5β - chloromethyl - 9α - fluoro-$\Delta^1$-19-nor-pregnene-11β,17α,21-triol-3,20-dione.

18. A process for the production of a 5β-chloromethyl-3-keto-$\Delta^1$-19-nor steroid selected from the group consisting of the androstene and pregnene series which comprises treating the corresponding compound selected from the group consisting of 5,19-cyclo-$\Delta^1$-3-keto androstenes, 5,19-cyclo-$\Delta^1$-3-keto pregnenes, 5,10-seco-5,19-cyclo-10β-fluoro-$\Delta^4$-3-keto-androstenes and 5,10-seco-5,19-cyclo-10β-fluoro-$\Delta^4$-3-keto-pregnenes, with hydrochloric acid.

19. The process of claim 18 wherein the reaction is carried out in a suitable water miscible organic solvent.

20. The process of claim 19 wherein the solvent is selected from the group consisting of lower alkanols and lower alicyclic and aliphatic hydrocarbon ethers.

21. The process of claim 19 wherein the reaction is carried out at reflux temperature for a period of time of about 30 minutes to 1 hour.

No references cited.

LEWIS GOTTS, *Primary Examiner.*